W. WEILER & H. NEHLSEN.
DYNAMO ELECTRIC MACHINE.
APPLICATION FILED JULY 16, 1915.

1,229,841.

Patented June 12, 1917.
3 SHEETS—SHEET 1.

Pole Pitch

Inventors:
Wilhelm Weiler,
Hermann Nehlsen,
by
Their Attorney.

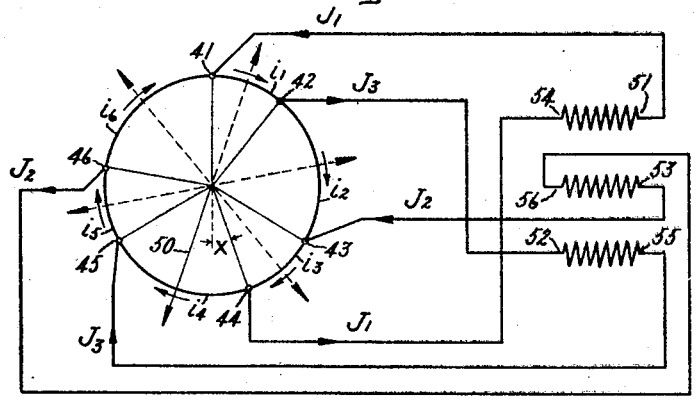
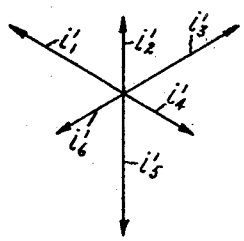
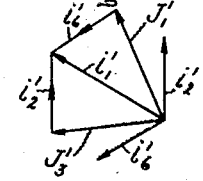
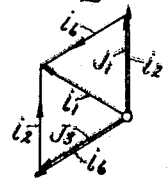
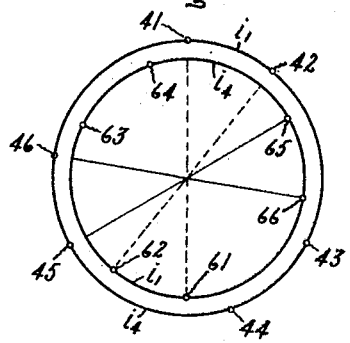

W. WEILER & H. NEHLSEN.
DYNAMO ELECTRIC MACHINE.
APPLICATION FILED JULY 16, 1915.
1,229,841.
Patented June 12, 1917.
3 SHEETS—SHEET 3.
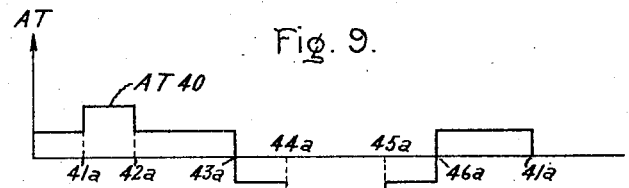
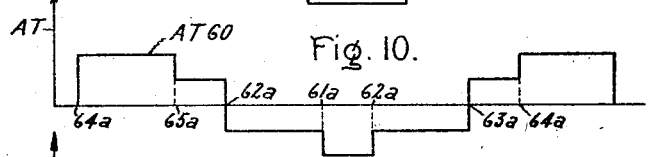
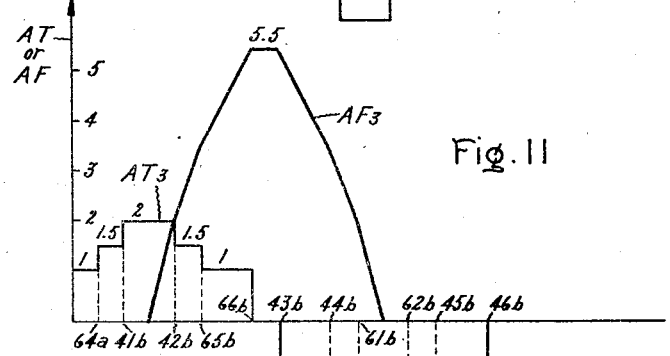
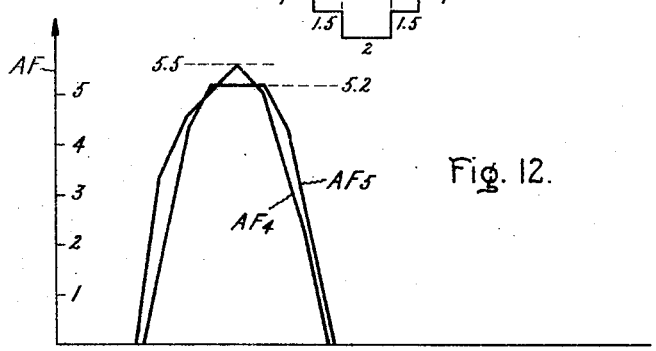
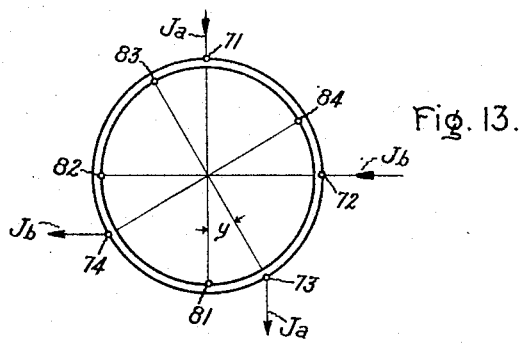
Inventors:
Wilhelm Weiler,
Hermann Nehlsen
by Albert G. Davis
Their Attorney

UNITED STATES PATENT OFFICE.

WILHELM WEILER, OF PANKOW, AND HERMANN NEHLSEN, OF NIEDERSCHÖNHAUSEN, GERMANY, ASSIGNORS TO GENERAL ELECTRIC COMPANY, A CORPORATION OF NEW YORK.

DYNAMO-ELECTRIC MACHINE.

1,229,841.  Specification of Letters Patent.  Patented June 12, 1917.

Application filed July 16, 1915. Serial No. 40,341.

*To all whom it may concern:*

Be it known that we, WILHELM WEILER, a subject of the King of Prussia, residing at Pankow, Germany, and HERMANN NEHLSEN, a subject of the King of Bavaria, residing at Niederschönhausen, Germany, have invented certain new and useful Improvements in Dynamo-Electric Machines, of which the following is a specification.

Our invention relates to dynamo-electric machines, and has for its object to provide a novel arrangement of connections for a machine in which the armature winding is provided with both commutator and collector rings.

In machines of the type indicated, of which the synchronous or rotary converter is the most notable example, there is a variation of about fourteen per cent. in the armature field produced by the watt currents therein. In a three-phase machine having the so-called six-phase connection of the winding, this variation occurs with six times the frequency of the supply current. Obviously, this variable field cannot be compensated by the constant excitation of the commutating pole, and as a result we get poor commutation and sparking at the brushes.

The object of our invention, then, is to provide an arrangement of the windings for a machine in which the armature winding is provided with a commutator and with two collector rings per phase, such that the variation in the armature field is greatly reduced and the commutation improved.

We accomplish this result by connecting the corresponding collector rings of each of the three phases to points on the armature winding separated by an angle different from 180 electrical degrees and by an arrangement of the field winding to be later described.

Figure 1:
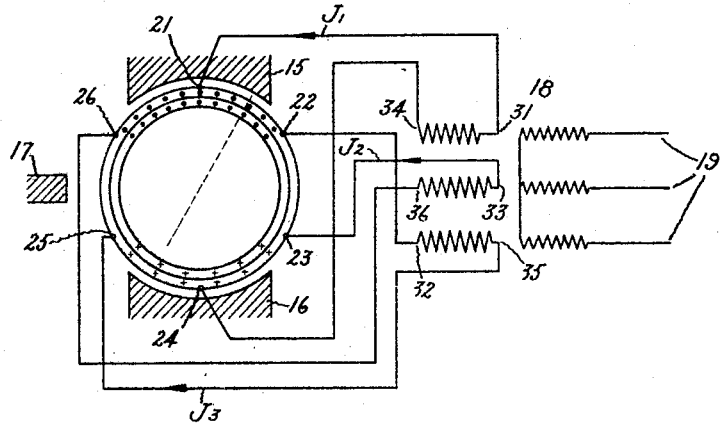
Figure 2:
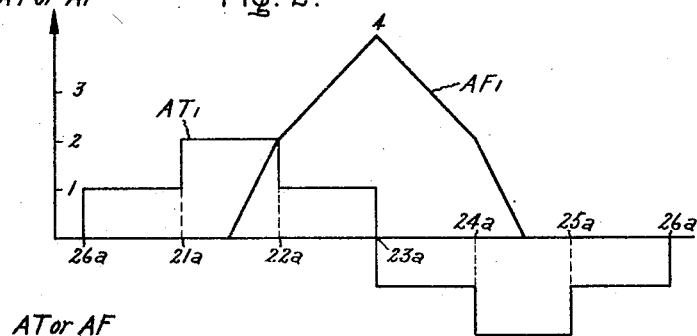
Figure 3:
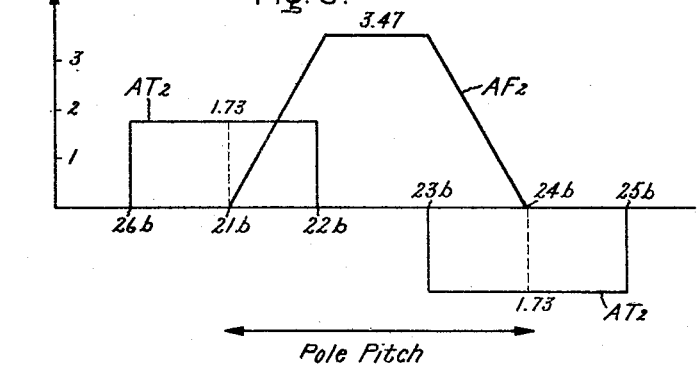

For a clearer understanding of our invention, reference is had to the accompanying drawings, in which Figure 1 is a diagrammatic view showing the winding arrangement of the armature of a rotary converter now commonly employed; Figs. 2 and 3 are explanatory diagrams showing the conditions obtained with the well-known winding of Fig. 1; Fig. 4 shows the application of our invention to an armature winding and the connections between the same and the supply transformer; Figs. 5, 6 and 7 are explanatory vector diagrams; Fig. 8 is a diagram illustrating the relation of the upper and lower coils of an armature winding arranged according to our invention; Figs. 9 to 12 are explanatory diagrams illustrating the conditions obtained with the machine illustrated in Fig. 4; and Fig. 13 is a diagram illustrating our invention applied to a quarter-phase machine.

In Fig. 1 we have illustrated diagrammatically a three-phase, two-pole rotary converter, with six-phase connections to its supply transformer. The exciting poles are indicated at 15 and 16, and the commutating pole at 17. The supply transformer 18 has its secondary connected to the slip rings (not shown) of the rotary converter, while the primary receives three-phase alternating-current energy from the mains 19. For simplicity, we have omitted the slip rings, and have indicated simply the points at which the leads between the transformer secondary and the armature are connected to the armature winding. It will be noted that the points 21, 23 and 25 are relatively displaced by 120 electrical degrees, and connected to corresponding or right-hand terminals 31, 33 and 35 of the transformer secondary. Since the machine illustrated is a two-pole machine, the electrical and space degrees are identical. We shall, therefore, refer simply to "degrees" in the following discussion, but it will be understood that we mean "electrical degrees" throughout. Similarly, the taps 22, 24 and 26 of the armature are relatively displaced by 120 degrees, and connected to corresponding or left-hand terminals 32, 34 and 36 of the transformer secondary. The armature illustrated is provided with a drum winding situated in slots, one side of each armature coil being located at the top of a slot, while the other side is located in the bottom of a slot which is displaced approximately 180 degrees. Further, it will be noted that the taps 21 and 24, 22 and 25, and 23 and 26 are displaced by 180 degrees, this being the customary practice. We shall later show that there are substantial advantages in displacing the taps 21 and 24, etc., by an angle different from 180 degrees.

By means of dots and crosses, we have indicated the conductors carrying the watt current for this particular position of the armature, while we have also indicated that those conductors which for any particular instant are carrying the incoming current carry currents $J_1$, $J_2$ and $J_3$. In Figs. 2 and 3, we have illustrated diagrammatically the conditions obtained with two different positions of the armature. In these figures the ordinates may be taken to represent either ampere turns (AT) or armature field (AF). The abscissæ represent distances around the armature periphery. Referring first to Fig. 3, wherein we have shown the conditions obtained for the position of the armature as shown in Fig. 1, the points $21_b$, $22_b$, and so on to $26_b$, correspond to the points 21 to 26 at which the slip ring taps are connected to the armature winding. The curve $AT_2$ shows that between the points 26 and 22 there is such a distribution of current that there are produced 1.73 ampere turns per centimeter of armature periphery. Between the points 22 and 23, where for this particular condition no watt current is flowing, there are no ampere turns, while between the points 23 and 25 the ampere turns produced are equal and opposite to those produced between the points 26 and 22. These armature currents produce a field substantially 90 degrees displaced from the exciting field, and opposing the field produced by the commutating poles. We have illustrated this effect by the curve $AF_2$ extending between the points $21_b$ and $24_b$ and attaining a maximum value of 3.47. For convenience, we have drawn a line below this diagram, indicating the pole pitch or distance between the centers of the exciting poles.

Let us now consider the conditions which are obtained when the axis of the winding section 21, 22, as indicated by a dotted line in Fig. 1, is displaced 30 degrees in a counter-clockwise direction, so that it is directly in the middle of the exciting pole. The conditions then obtained are represented in Fig. 2, and, as before, the points $21_a$, $22_a$ to $26_a$ correspond to the slip ring taps 21 to 26 of the armature windings. The curve $AT_1$ will now represent the ampere turns per centimeter of the armature periphery, and, as will be seen, will have an entirely different distribution from that shown in Fig. 3. The corresponding armature field is indicated by the curve $AF_1$, which attains a maximum value of 4. If the conditions obtained for all positions of the armature were correspondingly illustrated, it would be seen that these two diagrams show the maximum and minimum of the variable armature field, and, further, that a variation of ±7%, as here indicated, occurs with six times the frequency of the current supply. Obviously, therefore, it is impossible to compensate for this variable armature field by means of a commutating field of constant value. The result is that commutation is poor, and a sparking at the brushes results.

By means of our improved winding we are able to greatly reduce this variation, and thereby improve the commutation obtained. Fig. 4 illustrates the arrangement of our improved armature winding, and shows the displacement of the connections between the slip rings and the armature winding. One set of slip ring taps 41, 43 and 45 are mutually displaced 120 degrees, and are connected to corresponding or right-hand terminals 51, 53 and 55 on the secondary winding of the transformer. Further, the second set of taps 42, 44 and 46, which are mutually displaced 120 degrees, are connected to corresponding or left-hand terminals 52, 54 and 56. So far the connections are identical with those of the prior art. Instead, however, of displacing the taps 41 and 44, 42 and 45, and 43 and 46 by 180 degrees, it will now be seen that they are displaced by an angle of $180°-x$. In this particular case, $x=20°$, but, since, as will be well understood by those skilled in the art, the ratio of the alternating current and the direct current voltages is directly affected by this angle of displacement, the desired ratio must be kept in mind in selecting the value of $x$. As a result, the two sets of taps are no longer displaced by equal angles of 60 degrees. In Fig. 4, we have only indicated the connections of the upper layer of the armature winding, but it will be understood that the same is a drum winding in which the corresponding sides of a coil are displaced approximately 180 degrees. Considering Fig. 4 merely as a geometric diagram, it will be seen that the winding section 43, 44 includes an angle of $60°-x$, while the winding section 43, 42 includes an angle of $60°+x$. It, therefore, follows that the axis of each section, as indicated in the drawing by a radiating arrow, is displaced 60 degrees from the axis of each adjacent section. Accordingly, the voltages induced in two adjacent sections of the winding, and, consequently, the currents flowing therein, must also have a 60 degree phase displacement.

Now, symmetry requires that the effective values of the currents in the sections 41—42, 43—44 and 45—46 shall be equal to each other, and, likewise, that the effective values of the currents in sections 42—43, 44—45 and 46—41 shall be equal to each other. Let us indicate the current flowing from 41 to 42 by $i_1$, that from 42 to 43 by $i_2$, and so on to $i_6$. Furthermore, let us indicate the current flowing from the supply transformer to the point 41 by $J_1$, that flowing from the transformer to the point 43 by $J_2$, and that flowing to 45 by $J_3$. Starting with the hypothesis that the currents in adjacent sections have a phase displacement of 60 degrees, and that, for the sake of symmetry, currents in certain sections must be equal, let us draw a vector diagram, such as Fig. 5, which will fulfil these conditions. It will be seen that the currents $i'_1$, $i'_3$, and $i'_5$ are equal, and that the remaining currents are equal, the phase displacement between currents in adjacent sections being 60 degrees.

From a consideration of Fig. 4, it will be seen that the following conditions must be fulfilled:

First, that $J_1 = i_1 - i_6$; second, that $J_3 = i_1 - i_2$; third, that $J_2 = i_3 - i_2$, and so on, with the subtractions carried out vectorially if effective values are considered.

Referring now to Fig. 6, let us apply the first two of the above equations to the current values arbitrarily assumed in drawing Fig. 5. The resulting diagram shows that $J'_1$ and $J'_3$ are relatively displaced by an angle different from 120 degrees. We know, however, that the displacement of the supply currents must be 120 degrees. Let us, therefore, reconstruct Fig. 6 so that this condition will be fulfilled by altering the values of the currents. The resulting diagram is shown in Fig. 7, from which it will be seen that the currents $i_2$, $i_1$, and $i_6$ are equal. It, therefore, follows that in the sections 46—41, 41—42, 42—43, etc., of our improved winding, the currents flowing have the same effective value.

Fig. 8 shows the winding sections of the upper and lower layers of our improved winding. The taps 41 to 46, which are applied to the upper layer, will be seen to be identical with the arrangement illustrated in Fig. 4. The under layer is indicated by the inner circle, and for the sake of illustration we have applied the numerals 61 to 66, so that the section 61—62 of the lower layer corresponds to the section 41—42 of the upper layer, and, in fact, contains the other sides of the coils of the section 41—42. From reference to Fig. 4, it will be seen that the section 41—42 carries a current $i_1$, which has a phase displacement of 180 degrees from the current $i_4$ in the section 44—45. It, therefore, follows that the current in the section 64—65 is in phase with the current in the section 41—42. Due, however, to the unequal extent of these superimposed sections, the currents in the upper and lower layers of the winding are displaced in phase for certain portions of the armature periphery. The resulting armature field is produced by the sum of the ampere turns in the upper and lower layers.

In Figs. 9 and 10, we have drawn curves $AT_{40}$ and $AT_{60}$, which are derived in the same way as the curve $AT_1$ in Fig. 2, and which represent the conditions in the upper and lower layers, respectively, of our improved winding when the axis of the section 44—45, indicated by a full line arrow 50, is displaced so that it coincides with the axis of the exciting field; that is to say, is in the middle of the pole face. As before, the points $41^a$, $42^a$, etc., and the points $61^a$, $62^a$, etc., correspond to the points 41 to 46 and 61 to 66 in Fig. 8, while the ordinates of the curves represent ampere turns per centimeter of the armature periphery.

In Fig. 11, the curve $AT_3$ is obtained by combining the curves $AT_{40}$ and $AT_{60}$. The armature field produced thereby is indicated by a curve $AF_3$, which has a maximum value of 5.5. By means of a similar analysis, we are able to draw the curves in Fig. 12, in which $AF_4$ shows the armature field obtained when the axis 50 of Fig. 4 is displaced 15 degrees from the middle of the pole. In this case the maximum attains a value of 5.5. The curve $AF_5$ shows the armature field obtained when the axis 50 is displaced 30 degrees from the middle of the pole, and the maximum attained is 5.2. The result is that with the taps 41, 44 of the armature winding displaced by an angle of 160 degrees, the amplitude of the watt current armature field under the commutating pole varies only $\pm 2.8\%$. If the displacement of the taps 41, 44 were 150 degrees, then there would be a variation of only $\pm 2.1\%$. This gain, however, with a decreased displacement angle, is somewhat offset by the increased copper losses, which, with an angle of 150 degrees, are 20% greater than those obtained with the scheme of winding shown in Fig. 1. If the angle of displacement is only 160 degrees, as illustrated in Fig. 4, the copper losses are only 13% greater than with the winding shown in Fig. 1.

Our improved winding is also applicable to a quarter-phase converter, as has been illustrated in Fig. 13, wherein the two circles represent the upper and lower layers of the armature winding. In this case the slip ring taps are connected to the upper layer of the armature winding at points 71, 72, 73, and 74, the currents in the two phases being indicated by the letters $J_a$ $J_b$. As before, a drum winding is used, and the side of the coil to which the tap 71 is connected is approximately 180 degrees displaced, and situated at the point 81. The numerals 82, 83 and 84 are similarly applied, as in Fig. 8, for the purpose of showing the relation of the upper and lower windings. In this case the taps 71 and 73 are displaced by an angle of 180 degrees minus $y$, and $y$ has been chosen as 45 degrees. With this arrangement the variations of the amplitude of the armature field is reduced to $\pm 5.4\%$, as compared to $\pm 17\%$ with the diametral arrangement of slip ring taps now known.

It will thus be seen that we have devised a construction whereby the difficulties of commutation of a machine of this type may be largely overcome. We have also discovered that, when the armature of such a machine is provided with our improved winding, commutation may be still further improved by the use of a novel compensating field winding in combination with our improved armature winding. This compensating field winding is designed like the armature winding with overlapping coils as explained in connection with Figs. 8–11 of the drawings so that it produces the same form of field as does the armature, and is designed to be equal and opposite thereto. This arrangement is all the more easily attained because of the fact that this compensating winding is usually not concatenated. With this combination of armature and field windings, the rotating upper harmonic fields which disturb commutation are still further reduced.

It is well known in the design of direct current machines, that the current commutation may be improved by so arranging the armature slots that a tooth passes by a north commutating pole at the same time that a slot is passing the corresponding south commutating pole, and also that both sides of those coils which are short-circuited by the brushes are influenced by the commutating poles. By means of this arrangement the variation of commutating pole flux, which would otherwise be caused by the alternation of two teeth and two slots, is avoided. To carry out such a design with symmetrically located commutating poles, it is necessary that $\frac{N}{2P}$ shall not be a whole number where N equals the number of slots, and 2P the number of poles. It is also necessary, with the ordinary arrangement of six-phase converters, that $\frac{K}{6P}$ shall be a whole number where K equals the number of commutator segments. If this latter condition is not fulfilled, then the mechanically advantageous arrangement, wherein all the collector ring connections are located on one side of the armature, must be abandoned. In working out a design fulfilling these conditions, however, it will be found that the condition that $\frac{N}{2P}$ shall not be a whole number cannot be fulfilled if $\frac{K}{N}$ equals either 1 or 3; that is to say, in the ordinary arrangement, if we have either two or six bars per slot. It will also be found that the condition cannot be fulfilled if $\frac{N}{6P}$ is a whole number.

Now, with our improved arrangement of the armature windings, it will be found that this desirable arrangement, whereby a tooth and slot are simultaneously opposite the corresponding commutating poles, can be fulfilled if only a single condition is fulfilled, namely, that K shall be divisible by 3P without a remainder.

It will be evident that our invention is not limited to its application to synchronous rotary converters, but that it can to advantage be employed for the so-called frequency changers which rotate with relative synchronism, as well as for those polyphase commutator machines in which current is supplied to the rotor through collector rings. In these machines it will be found that the varying peak of the ampere turns does not remain stationary in the space under a commutating pole, but that it rotates according to the speed of the machine, and uniformly disturbs the commutation of all of the phases.

We, therefore, wish it understood that our invention is not limited to the particular arrangement shown and described, but that it includes all those modifications which come within the true scope and spirit of the invention defined in the accompanying claims.

What we claim as new and desire to secure by Letters Patent of the United States, is,—

1. In a dynamo-electric machine, the combination with an armature of main field poles and commutating poles, said armature being provided with a commutator, a plurality of pairs of collector rings and a winding to which said commutator and collector rings are electrically connected, the separate rings of each pair being connected to points on said winding having a displacement different from 180 electrical degrees and the corresponding rings of different pairs being connected to equidistant points on said winding.

2. In combination, a dynamo-electrical machine comprising an armature, means to produce a main field and means to produce a commutating field, and a polyphase source of current, said armature being provided with a commutator, a plurality of pairs of collecting rings adapted to be connected to said polyphase source, and a winding to which said commutator and collector rings are electrically connected, the separate rings of each pair being connected to points on said winding having a displacement different from 180 electrical degrees and the corresponding rings of different pairs being connected to equidistant points on said winding.

3. In a dynamo-electric machine, the combination with an armature of means to produce a main field and means to produce a commutating field, said armature being provided with a winding, a commutator, and a plurality of pairs of collector rings which are connected to said winding so that the winding is divided into as many phases as there are pairs of rings and so that one phase is connected between each pair of rings, the extremities of the portions of the winding connected between each pair of rings having an angular displacement different from 180 electrical degrees.

4. In a dynamo-electric machine, the combination with an armature of means to produce a main field and means to produce a commutating field, said armature being provided with a winding, a commutator, and a plurality of pairs of collector rings which are connected to said winding so that the winding is divided into as many phases as there are pairs of rings, and so that one phase is connected between each pair of rings, the extremities of the portions of the winding connected between each pair of rings having an angular displacement different from 180 electrical degrees and the corresponding extremities of said portions being equidistant from each other.

In witness whereof, we have hereunto set our hands this 12 day of July, 1915.

WILHELM WEILER.
HERMANN NEHLSEN.

Copies of this patent may be obtained for five cents each, by addressing the "Commissioner of Patents, Washington, D. C."